United States Patent
Liao et al.

(10) Patent No.: US 12,285,149 B2
(45) Date of Patent: Apr. 29, 2025

(54) CLEANING ROBOT

(71) Applicant: SHENZHEN SILVER STAR INTELLIGENT GROUP CO., LTD., Shenzhen (CN)

(72) Inventors: Chaozheng Liao, Shenzhen (CN); Lirong Ye, Shenzhen (CN)

(73) Assignee: Shenzhen Silver Star Intelligent Group Co., Ltd., Shenzhen (CN)

( * ) Notice: Subject to any disclaimer, the term of this patent is extended or adjusted under 35 U.S.C. 154(b) by 346 days.

(21) Appl. No.: 17/897,836

(22) Filed: Aug. 29, 2022

(65) Prior Publication Data

US 2023/0210325 A1 Jul. 6, 2023

(30) Foreign Application Priority Data

Dec. 30, 2021 (CN) .......................... 202111658459.7

(51) Int. Cl.
*A47L 9/04* (2006.01)
*A47L 5/22* (2006.01)
*A47L 9/00* (2006.01)
*A47L 9/28* (2006.01)

(52) U.S. Cl.
CPC ............... *A47L 9/0477* (2013.01); *A47L 5/22* (2013.01); *A47L 9/009* (2013.01); *A47L 9/2805* (2013.01); *A47L 2201/04* (2013.01)

(58) Field of Classification Search
CPC .......... A47L 9/0477; A47L 5/22; A47L 9/009; A47L 9/2805; A47L 2201/04
See application file for complete search history.

(56) References Cited

U.S. PATENT DOCUMENTS

| | | | | |
|---|---|---|---|---|
| 6,289,552 B1* | 9/2001 | McCormick | ............... | A47L 9/04 15/325 |
| 8,434,194 B2* | 5/2013 | Jeong | ......................... | A47L 9/04 15/375 |
| 8,776,311 B2* | 7/2014 | Genn | ......................... | A47L 9/04 15/377 |
| 9,924,843 B2* | 3/2018 | Song | ..................... | A47L 9/2857 |
| 11,172,802 B2* | 11/2021 | Bloomer | ................ | A47L 7/0009 |
| 11,291,345 B2* | 4/2022 | Davila | ................... | A47L 11/302 |
| 2016/0220081 A1* | 8/2016 | Xu | .......................... | A47L 9/0477 |
| 2020/0039079 A1* | 2/2020 | Brouwers | .............. | A47L 9/2826 |

(Continued)

FOREIGN PATENT DOCUMENTS

| | | | | |
|---|---|---|---|---|
| CN | 115429145 A | * | 12/2022 | ............ A46B 13/006 |
| CN | 113017487 B | * | 4/2023 | ............... A47L 11/24 |

(Continued)

*Primary Examiner* — Marc Carlson
(74) *Attorney, Agent, or Firm* — Rosenberg, Klein & Lee

(57) ABSTRACT

A cleaning robot includes a housing and a roller brush. The housing is provided with a mounting cavity with an opening at its bottom. The roller brush is rotatably arranged in the mounting cavity and at least part of the roller brush is extended out of the mounting cavity. At least part of the cavity wall is transparent to form a transparent area, and a viewing area is set at a position of the housing and above the transparent area. The closed observation space is formed in the housing, and the observation space communicated with the viewing area and the transparent area, so that the user can observe the working condition of the roller brush inside the mounting cavity.

19 Claims, 5 Drawing Sheets

(56) References Cited

U.S. PATENT DOCUMENTS

| | | | | |
|---|---|---|---|---|
| 2020/0221915 A1* | 7/2020 | Brouwers | .............. | G05D 1/247 |
| 2021/0204783 A1* | 7/2021 | Jang | .................... | A47L 11/4083 |
| 2021/0228039 A1* | 7/2021 | Brouwers | ........... | A47L 11/4005 |
| 2022/0031133 A1* | 2/2022 | Der Marderosian | ... | A47L 9/009 |
| 2022/0071468 A1* | 3/2022 | Brown | ................ | A47L 11/4019 |
| 2023/0346186 A1* | 11/2023 | Nguyen | ................ | A47L 11/302 |

FOREIGN PATENT DOCUMENTS

| | | | | |
|---|---|---|---|---|
| EP | 2770893 B1 * | 8/2023 | ........... | A46B 13/006 |
| WO | WO-2019173373 A1 * | 9/2019 | ............. | A47L 9/009 |

* cited by examiner

CLEANING ROBOT

CROSS-REFERENCE TO RELATED APPLICATIONS

This application is based upon and claims priority to Chinese Patent Application CN202111658459.7, filed Dec. 30, 2021, the entire contents of which are incorporated herein by reference.

TECHNICAL FIELD

The present disclosure relates to the technical field of cleaning equipment, and more particularly, to a cleaning robot.

BACKGROUND

A series of cleaning robots, such as mopping robots and mopping-sweeping robots, are devices that are constructed to perform cleaning tasks while traveling in any area without user control, and are usually used to clean the stains and garbage on the ground.

There is a roller brush (such as a brush and a mopping cloth) at a bottom of a housing of the cleaning robot. The roller brush lifts up dust, debris and other dirt on the ground by rotating, so that the dust, debris and other dirt are sucked away by a suction device of the cleaning robot, thereby cleaning the ground. However, as the roller brush of the cleaning robot is covered by the housing, it is difficult for the user to observe a working condition of the roller brush of the cleaning robot while the cleaning robot is working.

SUMMARY

A main purpose of the present disclosure is to provide a cleaning robot, which is intended to facilitate users to intuitively observe working conditions of the roller brush of the cleaning robot.

There is provided a cleaning robot according to embodiments of the present disclosure. The technical solution is as below:

According to an aspect of the embodiment of the present disclosure, there is provided a cleaning robot. In order to achieve the above-mentioned purpose, the present disclosure provides a cleaning robot, comprising:

- a housing provided with a mounting cavity with an opening at its bottom; and
- a roller brush rotatably arranged in the mounting cavity and at least part of the roller brush is extended out of the mounting cavity;
- wherein a wall of the mounting cavity has a transparent area and an viewing area is set at a position of the housing and above the transparent area, and
- wherein an observation space is formed in the housing, and the viewing area is communicated with the transparent area through the observation space, allowing the user to observe a working condition of the roller brush located in the mounting cavity.

BRIEF DESCRIPTION OF THE DRAWINGS

In order to illustrate embodiments of the present disclosure or the technical solutions in the prior art more clearly, the drawings that are used in the description of the embodiments or the prior art will be introduced briefly as follows. Obviously, the drawings in the following description are only some embodiments of the present disclosure, for those of ordinary skill in the art, other drawings may also be obtained based on the structures shown in these drawings without creative labor.

Figure 1:
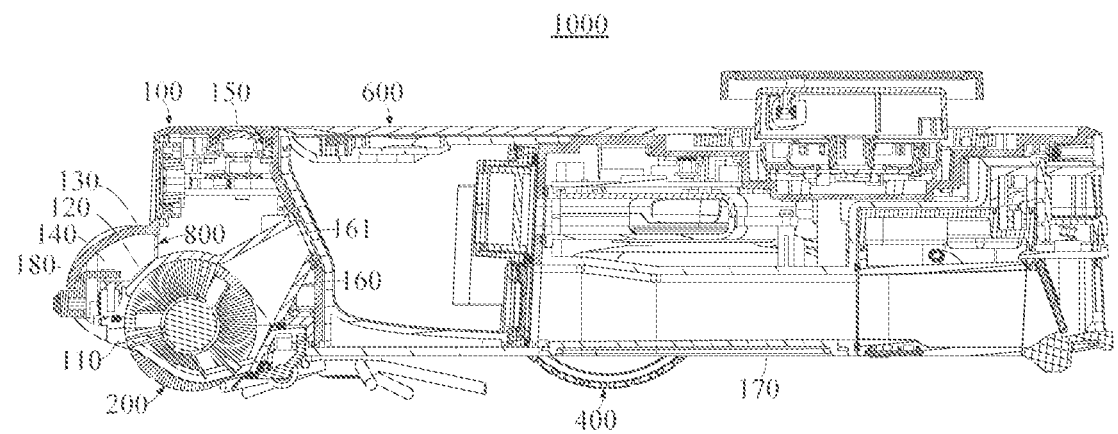
FIG. 1 is a sectional view of a cleaning robot according to an embodiment of the present disclosure.
Figure 2:
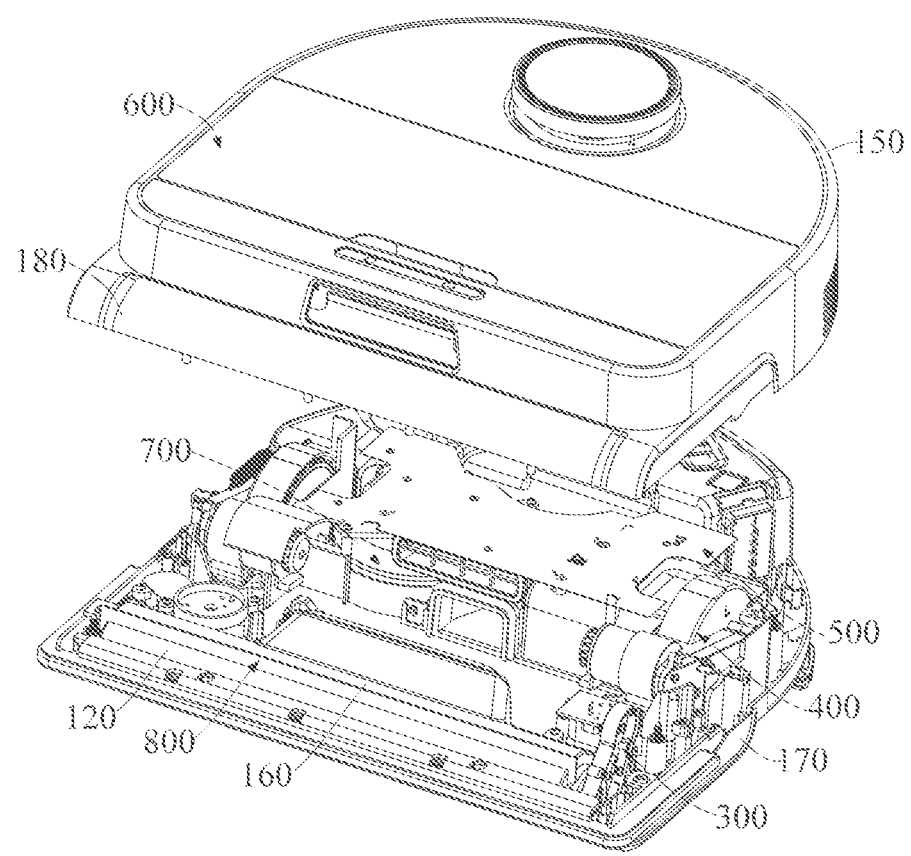
FIG. 2 is an exploded view of the cleaning robot in FIG. 1.

The realization, functional characteristics and advantages of the present disclosure will be further described with reference to the accompanying drawings in conjunction with the embodiments.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

It should be noted that all directional indications (such as up, down, left, right, front, back) in the embodiments of the present disclosure are only used to explain the relative positional relationship and the movement situation among various components under a specific posture (as shown in the accompanying drawings). If the specific posture changes, the directional indication also changes accordingly.

In addition, the descriptions including "first" and "second" in the present disclosure are only for descriptive purposes, and should not be understood as indicating or implying their relative importance or implying the number of indicated technical features. Thus, a feature delimited with "first", "second" may expressly or implicitly include at least one of that feature. In addition, the technical solutions in the various embodiments may be combined with each other, but are based on the realization by those of ordinary skill in the art. When the combination of technical solutions is contradictory or may not be realized, it should be considered that the combination of technical solutions is not exists, and it is not within the protection scope of the present disclosure.

The present disclosure provides a cleaning robot, which may be a device capable of autonomously traveling on the ground to perform cleaning actions such as vacuuming, mopping and washing on the ground, such as a sweeping robot, a mopping robot and a mopping and sweeping all-in-one robot. The cleaning robot may also be a device that performs cleaning actions, such as vacuuming, mopping, and washing, on the ground under the user's grip or manipulation, such as a hand-held vacuum cleaner and a hand-held mopping device.

Referring to FIGS. 1 to 2 or FIGS. 4 to 5, the cleaning robot 1000 includes a housing 100, a roller brush 200, a driving module 300, a travelling module 400, and a main control module 500. The roller brush 200, the travelling module 400, the driving module 300 and the main control module 500 are all arranged in the housing 100, and the driving module 300 and the travelling module 400 work under the control of the main control module 500.

The housing 100 not only serves as a bearing structure for other components of the cleaning robot 1000, but also serves as an appearance structure of the cleaning robot 1000. The housing 100 has many kinds of shapes. he housing 100 may be arranged in a cylindrical shape, the housing 100 may also be arranged in a square column shape, and the housing 100 may be arranged in other shapes. In some embodiments, the housing 100 is arranged in a cylindrical shape, and such arrangement can enhance the overall aesthetics of the cleaning robot 1000.

The housing 100 is provided with a mounting cavity 110 with an opening at its bottom. The mounting cavity 110 has many kinds of shapes. The mounting cavity 110 may be arranged as a cylindrical cavity, and the mounting cavity 110 may also be arranged as a cube-shaped cavity, which is not specifically limited herein. Since the mounting cavity 110 is mainly configured for the mounting of the roller brush 200, the mounting cavity 110 is arranged in a semi-cylindrical shape.

The opening of the mounting cavity 110 is opened at the bottom of the housing 100, so that when the housing 100 is placed on the surface to be cleaned, the opening of the mounting cavity 110 faces the surface to be cleaned. The shape of the opening of the mounting cavity 110 may be a rectangle, an ellipse and other shapes. In some embodiments, the opening of the mounting cavity 110 is formed in a rectangular shape, so that the roller brush 200 can protrude from the opening of the mounting cavity 110.

The roller brush 200 is generally arranged in a cylindrical shape. The roller brush 200 is rotatably mounted in the mounting cavity 110 and is in clearance fit with the cavity wall of the mounting cavity 110. Both ends of the roller brush 200 in an axial direction are rotatably connected to the housing 100. The roller brush 200 and the housing 100 may be rotatably connected in many ways. For example, the roller brush 200 and the housing 100 are rotatably connected by a rotating shaft and a bearing. For another example, the roller brush 200 and the housing 100 are rotatably connected by a rotating shaft and a shaft sleeve.

When the roller brush 200 is arranged in the mounting cavity 110, part of the roller brush 200 is extended out of the opening of the mounting cavity 110, so that an outer peripheral wall of the roller brush 200 can contact the ground. For example, the protruding volume of the roller brush 200 from the opening of the mounting cavity 110 is one-fifth of the volume of the roller brush. For another example, the protruding volume of the roller brush 200 from the opening of the mounting cavity 110 is one-fourth of the volume of the roller brush. The protruding volume of the roller brush 200 from the opening of the mounting cavity 110 may be various, which will not be listed herein.

The driving module 300 is configured to drive the roller brush 200 to rotate relative to the housing 100. There are many types of the driving module 300. The driving module 300 may composed of a motor and a coupling. One end of the coupling is connected to an output shaft of the motor, and the other end of the coupling is connected to the roller brush 200. The driving module 300 may also composed of a reduction gearbox and a motor. An input end of the reduction gearbox is connected to the output shaft of the motor, and an output end of the reduction gearbox is connected to the roller brush 200. The types of the driving module 300 are not listed one by one herein.

The travelling module 400 is mounted on the housing 100. The travelling module 400 is configured to drive the housing 100 to travel on the ground. There are many types of the travelling module 400. The travelling module 400 may also composed of a motor and two caterpillar tracks. The two caterpillar tracks are arranged on the left and right sides of the bottom of the housing 100, and each of the two motors is drivingly connected to the corresponding caterpillar track. The two motors work to drive the caterpillar tracks to work, so as to drive the housing 100 to travel on the ground.

The travelling module 400 may composed of a steering motor, two power motors, two driving wheels and a universal wheel. The two driving wheels are respectively located on the left and right sides of the bottom of the housing 100. Each of the two power motors is connected to the corresponding driving wheel in a transmission manner. The universal wheel may be arranged at the front or the rear of the housing 100. The steering motor is configured to drive the universal wheel to turn, and each of the two driving wheels is driven by the corresponding motor to drive the housing 100 to travel on the ground.

The main control module 500 may be a single-chip microcomputer, a Pulse-Width Modulation (PWM) controller, a microcontroller, or other structural components capable of receiving signals and transmitting signals, and the types of the controller are not specifically limited herein. The main control module 500 is electrically connected to the travelling module 400 and the driving module 300. The main control module 500, the travelling module 400 and the driving module 300 may be electrically connected through wireless communication such as Bluetooth and WIFI. The main control module 500 is electrically connected to the travelling module 400 and the driving module 300 through wires.

Since the opening of the mounting cavity 110 faces the ground, it is impossible to directly observe the roller brush 200 when it rotates in the mounting cavity 110, which is not conducive to observing the working condition of the roller brush 200. Therefore, at least part of the cavity wall of the mounting cavity 110 is arranged as a transparent area 120 and the area of the housing 100 above the transparent area 120 is arranged as a viewing area 130. Besides, an observation space 140 is further formed on the housing 100. The observation space 140 may be sealed. The transparent area 120 is communicated with the viewing area 130, so that the user can directly observe the roller brush 200 through the viewing area 130, the observation space 140 and the transparent area 120.

It should be noted that the transparent area 120 may be formed in many ways. For example, part of the cavity wall of the mounting cavity 110 is made of transparent material to form the transparent area 120. For another example, a port is provided through the mounting cavity 110, and a transparent plate is arranged at the port to form the transparent area 120. The transparent area 120 may also be formed in other ways, which will not be listed herein.

There are also many ways to form the viewing area 130. For example, part of the housing 100 is made of transparent material to form the viewing area 130. For another example, an opening is arranged through the housing 100, and a transparent plate is arranged at the opening, so as to form the viewing area 130. The viewing area 130 may also be formed in other ways, which will not be listed herein.

In one embodiment, the viewing area 130 is exposed on the surface of the cleaning robot, so that the working condition of the roller brush 200 can be observed at any time. The viewing area 13 is located lower than the upper surface of the housing 100. The viewing area 13 protrudes from the front part of the main body of the housing 100.

In one embodiment, the observation space 140 is a closed space, and the observation space 140 may be formed in many ways. The observation space 140 may be formed by a pipe structure on the housing 100. The observation space 140 may also be formed by a transparent capsule structure assembled into the housing 100. The observation space 140 may also be formed in other ways, which will not be listed herein.

When the cleaning robot 1000 is working, the user can directly observe the working condition of the roller brush 200 when it rotates through the viewing area 130, the observation space 140 and the transparent area 120, so that it is convenient for the user to know the working state of the roller brush 200 of the robot more intuitively, so as to facilitate the user to find out whether the roller brush 200 works abnormally in time. Since the viewing area 130 is communicated with the transparent area 120 through the closed observation space 140, it is difficult for dust to enter the observation space 140 communicating the viewing area 130 with the transparent area 120, so that the observation space 140 can maintain a good perspective for looking through for a long time.

Since the cleaning robot 1000 has many parts, in order to facilitate the assembly of the cleaning robot 1000, the housing 100 of the cleaning robot 1000 is usually formed by connecting a plurality of parts. Specifically, referring to FIG. 1 and FIG. 2 or FIG. 4 and FIG. 5, the housing 100 includes an upper cover 150, a middle sweeping bracket 160 and a chassis 170. The upper cover 150 is arranged above the chassis 170 and forms an accommodating space together with the chassis 170, and the middle sweeping bracket 160 is assembled on the chassis 170. The mounting cavity 110 with the opening at the bottom is formed on the middle sweeping bracket 160.

The driving module 300, the main control module 500 and the traveling module 400 are all arranged on the chassis 170. The roller brush 200 is assembled on the middle sweeping bracket 160, and the middle sweeping bracket 160 is further provided with a dust outlet 161 communicating with the mounting cavity 110. There is further equipped with a dust box 600 and a fan 700 between the upper cover 150 and the chassis 170. The dust box 600 is communicated with the dust outlet 161, and the fan 700 is communicated with the dust box 600. The fan 700 drives the air to flow, so that the dust, debris and other dirt brushed by the roller brush 200 can be sucked into the dust box 600.

Since the mounting cavity 110 is formed on the middle sweeping bracket 160, the transparent area 120 is formed on the middle sweeping bracket 160. Besides, since the upper cover 150 covers the entire chassis 170 and the middle sweeping bracket 160, and a part of the upper cover 150 is the viewing area 130 above the middle sweeping bracket 160, and the closed observation space 140 is correspondingly formed between the upper cover 150 and the chassis 170.

It should be noted that, the above observation space 140 may be formed in various ways. In some embodiments of the present disclosure, the observation space 140 is a cavity structure enclosed by the upper cover 150, the chassis 170, the middle sweeping bracket 160 and a plate structure. Specifically, referring to FIG. 1 and FIG. 2, the middle sweeping bracket 160 is sealedly connected to the chassis 170, and at least part of the upper cover 150 is sealedly connected to the chassis 170. The cleaning robot 1000 further includes a partition plate 800, and the observation space 140 is enclosed by the partition plate 800, the upper cover 150, the chassis 170 and the middle sweeping bracket 160. It can be understood that, in another embodiment, the front part of the upper cover 150 cooperates with the front part of the chassis 170 to form the observation space 140.

Since the observation space 140 is not required to cover the entire mounting cavity 110, the partition plate 800 is partially enclosed with the upper cover 150, the chassis 170 and the middle sweeping bracket 160 to form the observation space 140. In some embodiments, the partition plate 800 is enclosed with a front part of the upper cover 150 in the travelling direction of the cleaning robot 1000, a front part of the chassis 170 in the travelling direction of the cleaning robot 1000, and a front part of the middle sweeping bracket 160 in the travelling direction of the cleaning robot 1000 to form the observation space 140.

This arrangement can not only prevent the setting of the observation space 140 from affecting the arrangement of other components of the cleaning robot 1000, thereby facilitating the layout of the components of the cleaning robot 1000, but also reduce the sealed connection area between the middle sweeping bracket 160 and the chassis 170 and the sealed connection area between the upper cover 150 and the chassis 170, thereby reducing the assembly difficulty among the upper cover 150, the chassis 170 and the middle sweeping bracket 160. In one embodiment, the middle sweep bracket 160 is formed integrally with the chassis 170, that is, the middle sweep bracket 160 is a part of the chassis 170.

It is worth noting that the above-mentioned partition plate 800 may exist alone. In this circumstance, the partition plate 800 needs to be sealed when connected to the middle sweeping bracket 160 and the upper cover 150. The above-mentioned partition plate 800 may also be integrally formed with the middle sweeping bracket 160 or the upper cover 150. In this circumstance, the partition plate 800 needs to be sealedly connected to the upper cover 150 or the middle sweeping bracket 160, and the setting of the partition plate 800 is not specifically limited herein. In one embodiment, the partition plate 800 is integrally formed with the upper cover 150 or the chassis 170 or the middle sweep bracket 160.

Figure 3:
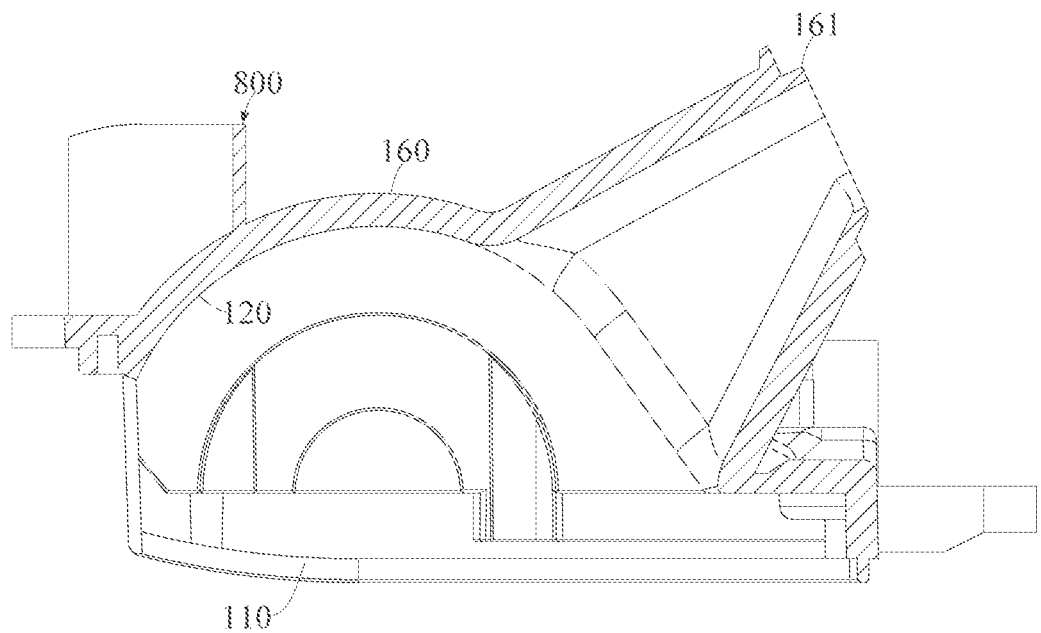
FIG. 3 is a schematic view illustrating an assembly of a middle sweeping bracket and a partition plate of the cleaning robot in FIG. 1 according to an embodiment of the present disclosure.

In some embodiments, referring to FIG. 3, the partition plate 800 is integrally formed with the middle sweeping bracket 160, and the partition plate 800 is extended along an axial direction of the roller brush 200. Both ends of the partition plate 800 in the longitudinal direction are sealedly connected to the side walls of the upper cover 150, and the side of the partition plate 800 away from the middle sweeping bracket 160 is sealedly connected to the top wall of the upper cover 150, so that the partition plate can enclosed with the upper cover 150, the chassis 170 and the middle sweeping bracket 160 together to form the observation space 140.

Further, both ends of the partition plate 800 in the longitudinal direction and a side of the partition plate 800 away from the middle sweeping bracket 160 are covered with sealing strips (not shown in the figures). When the upper cover 150 is assembled to the chassis 170, the sealing strips can effectively seal the partition plate 800 and the upper cover 150 under the pressing of the upper cover 150, so that the partition plate 800 can be sealedly connected to the upper cover 150.

In other embodiments of the present disclosure, the observation space 140 is formed by a tubular structure surrounded by the upper cover 150 and the middle sweeping bracket 160 together. Specifically, referring to FIG. 4 and FIG. 5, the cleaning robot 1000 further includes a connecting piece 900, and an observation channel 910 is arranged through the connecting piece 900. The observation channel 910 is a linear channel or a nearly linear channel. One end of the connecting piece 900 is abutted against the upper cover 150, and the other end of the connecting piece 900 is abutted against the middle sweeping bracket 160, so that one end of the observation channel 910 is aligned with the transparent area 120, and the other end of the observation channel 910 is aligned with the viewing area 130.

It is worth noting that the observation space 140 is closed. Therefore, the connecting piece 900 needs to be sealedly connected to the upper cover 150. The connecting piece 900 may be sealedly connected to the upper cover 150 by a sealant. The connecting piece 900 may also be sealedly connected to the upper cover 150 by a sealing gasket, and the connecting piece 900 may also be sealedly connected to the upper cover 150 in other ways, which will not be listed herein.

In some embodiments, the connecting piece 900 is sealedly connected to the upper cover 150 by a sealing ring 950. When the connecting piece 900 is assembled between the upper cover 150 and the middle sweeping bracket 160, the sealing ring 950 is pressed by the upper cover 150 and the middle sweeping bracket 160, so that the sealing ring 950 can be sealedly connected to the upper cover 150 and the middle sweeping bracket 160, thereby eliminating the gap between the upper cover 150 and the connecting piece 900.

Figure 7:
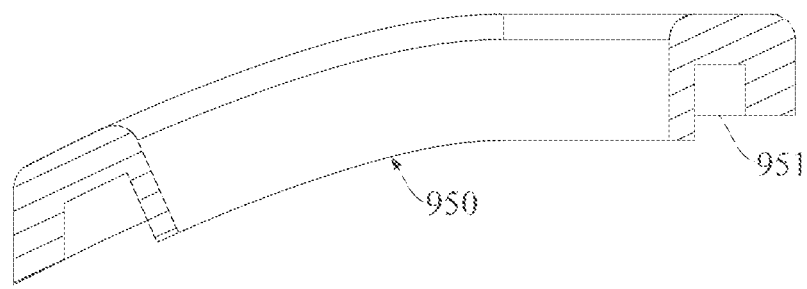
FIG. 7 is a sectional view of a sealing ring of the cleaning robot in FIG. 4 according to another embodiment of the present disclosure.

Further, referring to FIG. 7, a surface of the sealing ring 950 facing away from the upper cover 150 is recessed to form a positioning groove 951 extending along its circumferential direction. The positioning groove 951 is configured to be fitted with one end of the connecting piece 900 adjacent to the viewing area 130 in a plug-in manner. This arrangement not only facilitates the assembly of the connecting piece 900 and the sealing ring 950, but also facilitates the assembly of the sealing ring 950 between the connecting piece 900 and the upper cover 150.

Figure 6:
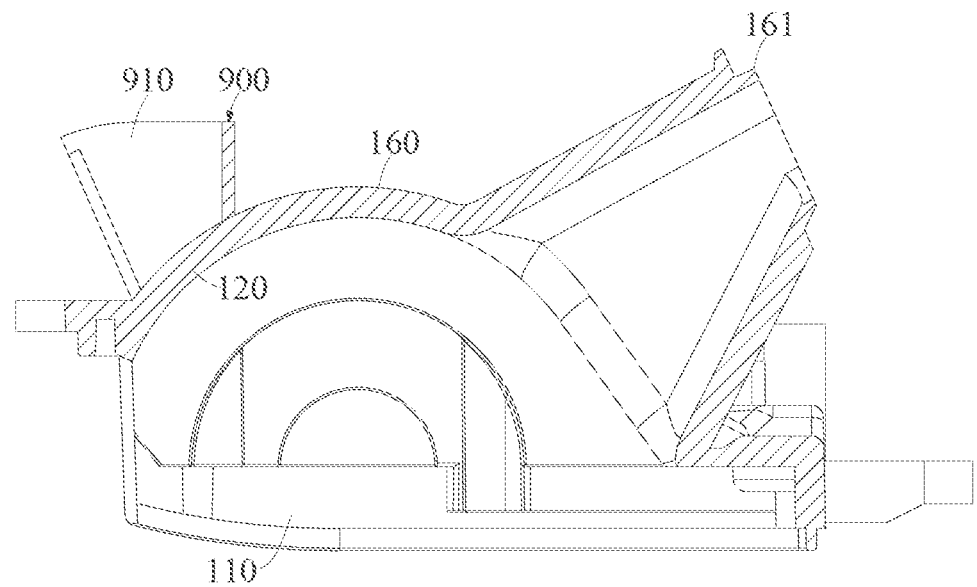
FIG. 6 is a schematic view illustrating an assembly of the middle sweeping bracket and a connecting piece of the cleaning robot in FIG. 4 according to an embodiment of the present disclosure.

It should be noted that the connecting piece 900 is also sealedly connected to the middle sweeping bracket 160. The sealing method between the connecting piece 900 and the middle sweeping bracket 160 may refer to the sealing method between the connecting piece 900 and the upper cover 150. In some embodiments, referring to FIG. 6, the connecting piece 900 and the middle sweeping bracket 160 are integrally formed. This arrangement not only ensures the connection strength between the connecting piece 900 and the middle sweeping bracket 160, but also ensures the tightness between the connecting piece 900 and the middle sweeping bracket 160.

In some other embodiments of the present disclosure, the observation space 140 is formed by a transparent capsule structure. Specifically, the transparent capsule structure further includes an elastic air capsule (not shown in the figures) made of transparent material. The elastic air capsule is arranged between the upper the cover 150 and the middle sweeping bracket 160, and the elastic air capsule is abutted against the transmitting area and the viewing area 130, so as to form the observation space 140.

It is worth noting that the elastic air capsule can still generate a certain elastic deformation after being inflated. Therefore, when the elastic air capsule is assembled between the middle sweeping bracket 160 and the upper cover 150, the elastic air capsule can be elastically deformed by being squeezed between the middle sweeping bracket 160 and the upper cover 150, so that the elastic air capsule can be abutted against the viewing area 130 of the upper cover 150 and the transparent area 120 of the middle sweeping bracket 160, which is convenient to the formation of the observation space 140.

Since part of the air in the elastic air capsule will be lost after the elastic air capsule is used for a long time, the cleaning robot 1000 further includes an air pump (not shown in the figures) and an air pressure detection device (not shown in the figures). The air pressure detection device is configured to detect the air pressure in the elastic air capsule. The air pump is communicated with an elastic air capsule pipeline, and the pipeline connecting the air pump to the elastic air capsule is further provided with a one-way valve (not shown in the figures) to ensure that the air can only enter the elastic air capsule. The air pump and the air pressure detection device are both electrically connected to the main control module 500 of the cleaning robot 1000, and the main control module 500 controls the air pump to work according to the air pressure detection device.

When a real-time air pressure value in the elastic air capsule detected by the air pressure detection device is lower than a preset air pressure value, the main control module 500 controls the air pump to start to inflate the elastic air capsule. When the real-time air pressure value in the elastic air capsule detected by the air pressure detection device is equal to or greater than the preset air pressure value, the main control module 500 controls the air pump to stop working. This arrangement can ensure that the elastic air capsule is always abutted against the transparent area 120 and the viewing area 130, thereby ensuring that the transparent area 120 and the viewing area 130 are always communicated through the closed observation space 140.

Based on the above-mentioned embodiments, it should be noted that the housing 100 of the cleaning robot 1000 has a certain thickness. If the viewing area 130 is arranged on the top of the housing 100 and the transparent area 120 is arranged at the bottom of the housing 100, the height of the observation space 140 connecting the viewing area 130 and the transparent area 120 is relatively high. In view of above, in some embodiments of the present disclosure, the height of the viewing area 130 relative to the ground is set to be lower than that of the top surface of the housing 100, so that the distance between the viewing area 130 and the transparent area 120 is reduced to reduce the height of the observation space 140. However, it should be understood that the height of the observation space should be set in an appropriate range to ensure that the viewing area 130 has a large enough area and viewing angle to facilitate viewing the roller brush.

Figure 4:
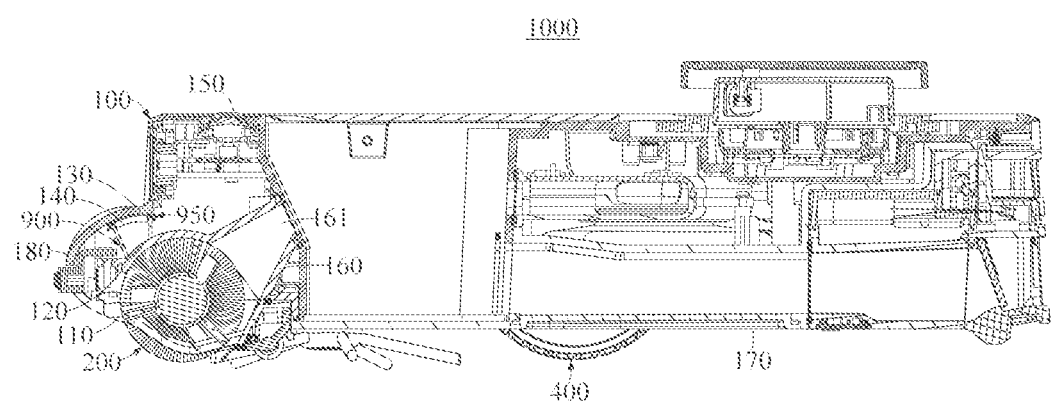
FIG. 4 is a sectional view of the cleaning robot according to another embodiment of the present disclosure.
Figure 5:
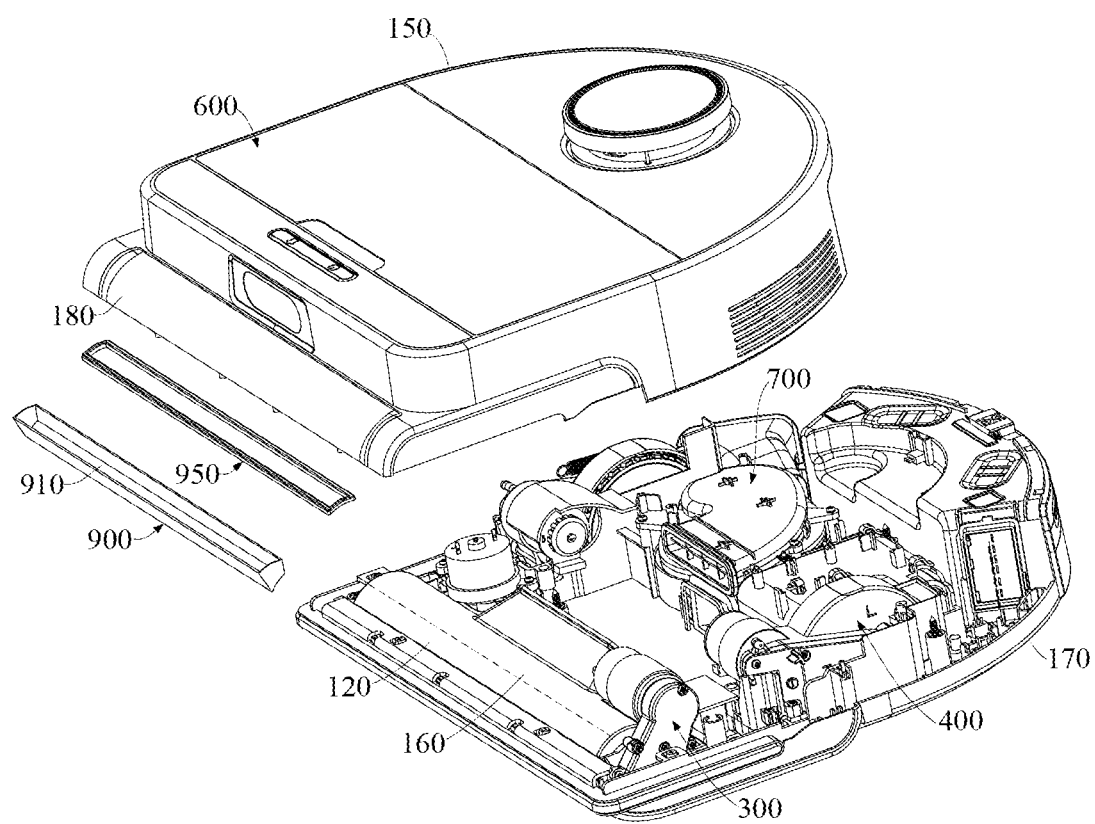
FIG. 5 is an exploded view of the cleaning robot in FIG. 4.
Figure 8:
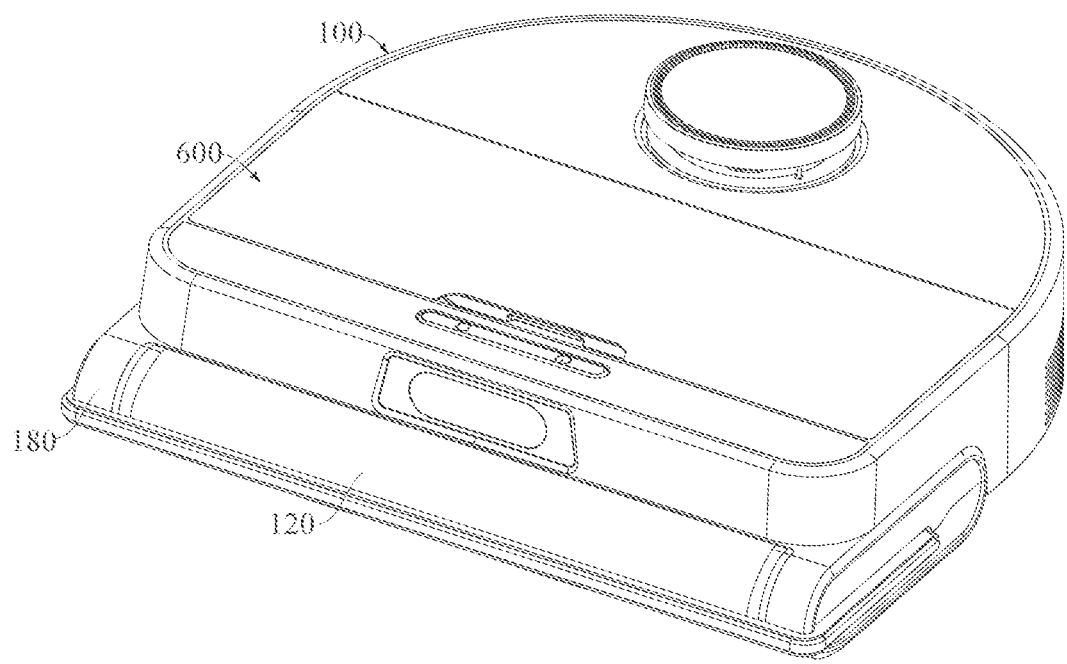
FIG. 8 is a schematic structural view of the cleaning robot according to another embodiment of the present disclosure.

Specifically, referring to FIG. 1 and FIG. 8 or FIG. 4 and FIG. 8, the housing 100 has a front end and a rear end arranged oppositely in the traveling direction of the cleaning robot 1000. A part of the front end of the housing 100 adjacent to the ground protrudes forward to form a protruding portion 180. At least part of the mounting cavity 110 is formed in the protruding portion 180. The transparent area 120 is arranged in the protruding portion 180, and the viewing area 130 is formed on the protruding portion 180 to expose to the air.

It should also be noted that, in some embodiment, the housing 100 includes the upper cover 150, the chassis 170 and the middle sweeping bracket 160. The front end of the upper cover 150 is close to the chassis 170 and extends forward to form a low portion protruding forward, and the front end of the chassis 170 extends forward correspondingly, and the two are connected to form the low protruding portion 180.

When the observation space 140 is enclosed by the partition plate 800 (or the connecting piece 900), the upper cover 150, the chassis 170 and the middle sweeping bracket 160, a part of the partition plate 800 or a part of the connecting piece 900 extends along the direction from the middle sweeping bracket 160 to the upper cover 150, and is abutted against an protruding part of the front end of the upper cover 150, so that the observation space 140 is formed in the protruding portion 180.

Since the thickness of the protruding portion 180 is smaller than the thickness of the housing 100, the height of the observation space 140 can be effectively reduced, and the observation space 140 may be arranged at the position of the protruding portion 180, the arrangement of other components of the cleaning robot 1000 can avoid being affected due to the setting of the observation space 140.

In addition, part of the mounting cavity 110 is formed as the protruding portion 180, allowing the roller brush 200 to be arranged more closely to the front end of the housing 100. Besides, since the protruding portion 180 is arranged lower than the top of the housing 100, the cleaning robot 1000 can also effectively clean the underside of the sofa, the underside of the cabinet and the underside of other items, which also solves the problem that the cleaning robot 1000 cannot clean the space with a height lower than the housing 100 due to the height of the housing 100.

In the present disclosure, the mounting cavity with the opening at its bottom is provided on the housing of the cleaning robot, the roller brush of the cleaning robot is rotatably arranged in the mounting cavity and at least part of the roller brush is extended out of the mounting cavity. At least part of a cavity wall of the mounting cavity is transparent to form a transparent area, and a viewing area is set at a position of the housing and above the transparent area. The transparent area is further communicated with the viewing area through a closed observation space, allowing the user to directly observe the working condition of the roller brush through the viewing area, the observation space and the transparent area, so that the abnormal operation of the roller brush can be found in time. Besides, the observation space is sealed, making it difficult for dust to enter the observation space, so that the observation space can maintain a good perspective effect for a long time.

Figure 9:
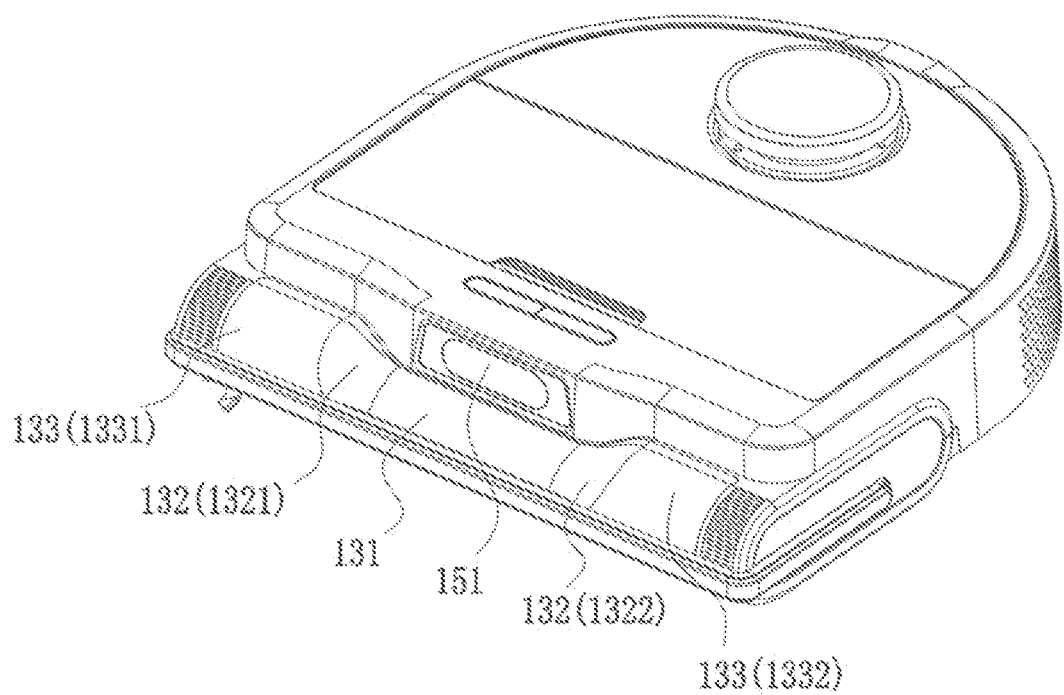
FIG. 9 is a schematic structural view of the cleaning robot according to still another embodiment of the present disclosure.

In some embodiments, as shown in FIG. 9, the cleaning robot 1000 is provided with an obstacle detection element 151, such as an obstacle proximity sensor, an obstacle identification sensor. The obstacle detection element 151 is disposed on the front side wall of the housing 100 and is generally located behind and above the viewing area 130. In some of the embodiments, the portion of the viewing area 130 corresponding to the obstacle detection element 151 is recessed to form a recessed portion 131, so as to avoid interference with the obstacle detection element. The two end parts of the viewing area 130 still maintain relatively higher than the recessed portion 131, in order to ensure that the viewing area has a large enough visible area. Through the viewing area 130, it is possible to see the working condition of the roller brush/cleaning element, for example, whether it is stuck by garbage or entangled with filaments, or whether there is too much dirt attached, or whether the humidity of the roller brush is appropriate, so as to facilitate dealing with these situations in time.

Specifically, in one embodiment, the viewing area 130 includes a recessed portion 131, a transition portion 132 and a wide-view portion 133. The recessed portion 131 is located directly in front of the obstacle detection element 151 to avoid obstructing the view or the signal reception and transmission of the obstacle detection element 151. The transition portion 132 includes a first transition portion 1321 and a second transition portion 1322, which are located on two sides of the recessed portion 131 respectively, and are used for connecting the recessed portion 131 and the wide-view portion 133. Compared with the recessed portion 131 and the transition portion 132, the wide-view portion 133 has a wider viewing angle, which is more convenient for the user to observe the working condition of the roller brush 200. The wide-view portion 133 includes a first wide-view portion 1331 and a second wide-view portion 1332. The first wide-view portion 1331 is located at the side of the first transition portion 1321 away from the recessed portion 131, and the second wide-view portion 1332 is located at the side of the second transition portion 1332 away from the recessed portion 131. The outer edge on the cross section in the traveling direction of the first transition portion 1321 gradually becomes larger from the end close to the recessed portion 131 to the end close to the first wide-view portion 1331. Similarly, the outer edge on the cross section in the traveling direction of the second transition portion 1322 gradually becomes larger from the end close to the recessed portion 131 to the end close to the second wide-view portion 1332. In another embodiment, the cross-sectional area in the traveling direction of the first transition portion 1321 gradually increases from the end close to the recessed portion 131 to the end close to the first wide-view portion 1331. Similarly, the cross-section area of the second transition portion 1322 in the traveling direction gradually increases from the end close to the recessed portion 131 to the end close to the second wide-view portion 1332. The outer edge on the cross section of the wide-view portion 133 in the traveling direction is larger than that of the transition portion 132 in the traveling direction, and the outer edge on the cross section of the transition portion 132 in the traveling direction is larger than that of the recessed portion 131 in the traveling direction.

The highest position of the wide-view portion 133 on the housing 100 may be lower than, higher than or equal to the position where the obstacle detection element 151 is located on the housing 100.

Described above are only preferred embodiments of the present disclosure, and are not intended to limit the scope of the present disclosure. Under the inventive concept of the present disclosure, equivalent structural transformations made by using the contents of the description and drawings of the present disclosure, or directly/indirectly applied in other related technical fields are all included in the scope of patent protection of the present disclosure.

What is claimed is:
1. A cleaning robot, comprising:
a housing provided with a mounting cavity with an opening at a bottom of the housing; and a roller brush rotatably mounted in the mounting cavity and at least part of the roller brush is extended out of the mounting cavity;

wherein a wall of the mounting cavity has a transparent area, and a viewing area is set at a position of the housing and above the transparent area, and wherein an observation space is formed in the housing, and the viewing area is communicated with the transparent area through the observation space, allowing the user to observe a working condition of the roller brush located in the mounting cavity;

wherein the housing comprises an upper cover, a middle sweeping bracket and a chassis, wherein the middle sweeping bracket is mounted at the chassis, and is provided with the mounting cavity which has an opening at its own bottom, and at least part of the middle sweeping bracket is transparent to form the transparent area, and wherein the upper cover covers the chassis and the middle sweeping bracket, and a part of the upper cover is the viewing area above the transparent area, and wherein the observation space is formed between the upper cover and the chassis.

2. The cleaning robot of claim 1, wherein the middle sweeping bracket is connected to the chassis, and the upper cover is connected to the chassis, wherein the cleaning robot further comprises a partition plate, and the observation space is enclosed by the partition plate, the upper cover, the chassis and the middle sweeping bracket together.

3. The cleaning robot of claim 2, wherein the partition plate is formed integrally with one of the upper cover, the middle sweeping bracket and the chassis.

4. The cleaning robot of claim 1, further comprising a connecting piece, wherein an observation channel is arranged through the connecting piece, wherein one end of the connecting piece is connected to the middle sweeping bracket, and the other end of the connecting piece is connected to the upper cover, wherein one end of the observation channel is aligned with the transparent area, and the other end of the observation channel is aligned with the viewing area, and the observation space is enclosed by the connecting piece, the upper cover and the middle sweeping bracket together.

5. The cleaning robot of claim 4, further comprising a sealing ring, wherein the sealing ring is configured to sealedly connect the connecting piece to the upper cover.

6. The cleaning robot of claim 5, wherein a surface of the sealing ring facing away from the upper cover is recessed to form a positioning groove extending along a circumferential direction of the sealing ring, and the positioning groove is configured to be fitted with one end of the connecting piece adjacent to the viewing area in a plug-in manner.

7. The cleaning robot of claim 4, wherein the connecting piece and the middle sweeping bracket are integrally formed.

8. The cleaning robot of claim 1, wherein the middle sweeping bracket is formed integrally with the chassis.

9. The cleaning robot of claim 1, wherein the observation space is formed by a transparent capsule structure.

10. The cleaning robot of claim 9, wherein the transparent capsule structure comprises an elastic air capsule made of transparent material, wherein the elastic air capsule is arranged between the upper cover and the middle sweeping bracket, and the elastic air capsule abuts against the transmitting area and the viewing area, to form the observation space.

11. The cleaning robot of claim 1, wherein the observation space is sealed.

12. The cleaning robot of claim 1, wherein the housing comprises an upper cover and a chassis which is coupled with the upper cover to form the observation space in the front end of the cleaning robot.

13. The cleaning robot of claim 1, wherein a port is provided through the mounting cavity, and a transparent plate is arranged at the port to form the transparent area.

14. The cleaning robot of claim 1, wherein the housing is provided with a front end and a rear end opposite to the front end in a traveling direction of the cleaning robot, wherein a part of the front end of the housing adjacent to the ground is protruded forward to form a protruding portion, and at least part of the mounting cavity is formed in the protruding portion, allowing the roller brush to be arranged more closely to the front end of the housing.

15. The cleaning robot of claim 14, the protruding portion is arranged lower than the top of the housing.

16. The cleaning robot of claim 14, the opening of the mounting cavity is formed in a rectangular shape, so that the roller brush protrudes from the opening of the mounting cavity.

17. The cleaning robot of claim 14, wherein the transparent area is arranged in the protruding portion, and the viewing area is formed on the protruding portion to expose to the air.

18. The cleaning robot of claim 1, further comprising an obstacle detection element arranged on a front side wall of the housing and facing forward, and at least part of the viewing area is lower than the obstacle detection element, avoiding interference in the viewing area.

19. The cleaning robot of claim 18, wherein the viewing area comprises a recessed portion, a wide-view portion and a transition portion which connects the recessed portion and the wide-view portion, wherein the recessed portion is lower than the obstacle detection element, and the height of apposition where the wide-view portion is located is smaller or equal to or greater than that of a position where the obstacle detection element is located.

* * * * *